Patented Dec. 11, 1945

2,390,713

UNITED STATES PATENT OFFICE 2,390,713

ALKYLSULPHENYL DITHIOCARBAMATES

Madison Hunt, Claymont, Del., assignor to E. I. du Pont de Nemours & Company, Wilmington, Del., a corporation of Delaware No Drawing. Application March 16, 1944, Serial No. 526,816

6 Claims. (Cl. 260—567)

This invention relates to esters of dithiocarbamic acids and more particularly to alkylsulphenyl dithiocarbamates, and to their preparation.

This invention has as an object, the production of new and useful compositions of matter. A further object is the preparation of esters of dithiocarbamic acids. Another object is the preparation of alkylsulphenyl dithiocarbamates. Other objects will be apparent from the following description of the invention.

These objects are accomplished by the following invention wherein a salt, usually an alkali metal salt, of an N substituted dithiocarbamate is reacted with an aliphatic sulphenyl thiocyanate. The invention comprises also the aliphatic sulphenyl dithiocarbamates thus prepared. The thus readily available aliphatic sulphenyl N substituted dithiocarbamates have the formula

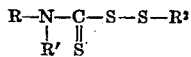

wherein R and R' are selected from the class consisting of hydrogen, hydrocarbon radicals, and radicals which, together with the nitrogen, form a heterocyclic ring but there is not more than one hydrogen atom on the nitrogen, $R^2$ is a monovalent aliphatic radical, preferably hydrocarbon.

The invention is further illustrated by the folowing examples in which parts are by weight.

Example I

A solution of 11.6 parts of thiocyanogen in 100 parts of dry ether is cooled to 0° C., and 5.8 parts of ethyl mercaptan dissolved in 50 parts of dry ether is added drop-wise with stirring. A solution of 18.8 parts of sodium dimethyldithiocarbamate dissolved in 50 parts of water is added to the ethylsulphenyl thiocyanate solution thus prepared and the mixture is then vigorously stirred at room temperature for one hour. The mixture is then filtered and the ether layer is separated and dried over magnesium sulphate. The ethereal solution is then cooled to −80° C. and the crystalline product is separated by filtration and quickly washed with small portions of ether cooled to −80° C. The product ethylsulphenyl dimethyldithiocarbamate, which melts below 0° C. is quickly placed in a suitable container and dried in vacuo over phosphoric anhydride. Analysis: Calculated for $C_5H_{11}NS_3$: N, 7.73. Found N, 8.05.

Example II

A solution of 11.6 parts of thiocyanogen in 100 parts of dry ether is cooled to 0° C. and 8.4 parts of n-butyl mercaptan dissolved in 50 parts of dry ether is added drop-wise with stirring. A solution of 18.8 parts of sodium dimethyldithiocarbamate dissolved in 50 parts of water is added to the butylsulphenyl thiocyanate solution thus prepared and the mixture is then vigorously stirred at room temperature for one hour. The mixture is then filtered and the ether layer is separated and dried over magnesium sulphate. The ethereal solution is then cooled to −80° C. and the crystalline product is separated by filtration and quickly washed with small portions of ether cooled to −80° C. The product, n-butylsulphenyl dimethyldithiocarbamate, which melts below 0° C. is distilled at 170–175° C. at 2 mm. Yield: 8.25 parts or 43% of the theory. Analysis: Calculated for $C_7H_{15}NS_3$: N, 6.70. Found: N, 6.35.

Although the invention is illustrated by the reaction of metal salts of dimethyldithiocarbamic acids with ethylsulphenyl and n-butylsulphenyl thiocyanates, it is applicable to salts of N substituted, preferably, N-alkyl, dithiocarbamic acids in general. Other salts include sodium methyldithiocarbamate, calcium ethyldithiocarbamate, magnesium butyldithiocarbamate, sodium benzyldithiocarbamate, sodium phenyldithiocarbamate, sodium diethyldithiocarbamate, sodium dibutyldithiocarbamate, sodium dicyclohexyldithiocarbamate, sodium phenylethyldithiocarbamate, sodium dibenzyldithiocarbamate, sodium pentamethylenedithiocarbamate, sodium hexamethylenedithiocarbamate, sodium N-phenyl-N-methyldithiocarbamate and sodium 4-morpholinecarbodithioate. Examples of other aliphatic sulphenyl thiocyanates which are operative in the process of the invention include isopropylsulphenyl thiocyanate, butylsulphenyl thiocyanate, amylsulphenyl thiocyanate, octylsulphenyl thiocyanate, carboxymethylsulphenyl thiocyanate, beta-hydroxyethylsulphenyl thiocyanate, gamma-hydroxytrimethylenesulphenyl thiocyanate, methoxyethylsulphenyl thiocyanate and carboethoxymethylsulphenyl thiocyanate.

Solvents which may be used as the reaction medium for the preparation of the aliphatic sulphenyl dithiocarbamates include alcohols such as methanol, n-propanol and isobutanol as well as their mixture with water.

The reaction is generally carried out within the temperature range of 0 to 50° C. However, it is convenient to operate at or near room temperature as illustrated in the examples.

The products of this invention are useful for various commercial purposes. Thus, they may be used as pharmaceuticals, as pest-control agents, e. g., insecticides, bactericides, fungicides, mothproofing agents, and as additive agents for elastomers.

As many widely different embodiments of this invention may be made without departing from the spirit and scope thereof, it is to be understood that this invention is not to be limited to the specific embodiments thereof, except as defined in the appended claims.

What is claimed is:

1. An alkylsulphenyl dialkyldithiocarbamate.
2. An alkylsulphenyl dimethyldithiocarbamate.
3. A butylsulphenyl dialkyldithiocarbamate.
4. n-Butylsulphenyl dimethyldithiocarbamate.
5. Process which comprises reacting butylsulphenyl thiocyanate with sodium dimethyldithiocarbamate and isolating the butylsulphenyl dimethyldithiocarbamate.
6. Process which comprises reacting an alkyl sulphenyl thiocyanate with a salt of an N,N-dialkyldithiocarbamate.

MADISON HUNT.